United States Patent
Delahaye et al.

(10) Patent No.: US 9,799,891 B2
(45) Date of Patent: Oct. 24, 2017

(54) METHOD FOR PRODUCING AN AIR ELECTRODE, THE ELECTRODE THUS OBTAINED AND ITS USES

(75) Inventors: Thibaud Delahaye, Tresques (FR); Pankaj-Kumar Patro, Mumbai (IN)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 618 days.

(21) Appl. No.: 14/003,582

(22) PCT Filed: Mar. 7, 2012

(86) PCT No.: PCT/EP2012/053896

§ 371 (c)(1),
(2), (4) Date: Oct. 3, 2013

(87) PCT Pub. No.: WO2012/120033

PCT Pub. Date: Sep. 13, 2012

(65) Prior Publication Data

US 2014/0017592 A1    Jan. 16, 2014

(30) Foreign Application Priority Data

Mar. 9, 2011    (FR) ..................... 11 51919

(51) Int. Cl.
| | |
|---|---|
| H01M 4/88 | (2006.01) |
| H01M 4/86 | (2006.01) |
| H01M 4/90 | (2006.01) |
| B28B 11/00 | (2006.01) |
| H01M 8/1253 | (2016.01) |
| H01M 8/126 | (2016.01) |

(52) U.S. Cl.
CPC .......... H01M 4/8885 (2013.01); B28B 11/00 (2013.01); H01M 4/8621 (2013.01); H01M 4/8828 (2013.01); H01M 4/9033 (2013.01); H01M 8/126 (2013.01); H01M 8/1253 (2013.01); Y02E 60/525 (2013.01); Y02P 70/56 (2015.11)

(58) Field of Classification Search
None
See application file for complete search history.

(56) References Cited

U.S. PATENT DOCUMENTS

2002/0127456 A1* 9/2002 Pham .................. C23C 28/00
                                                       429/496
2006/0280998 A1   12/2006 Ying et al.
(Continued)

OTHER PUBLICATIONS

Mauvy et al., Oxygen reduction on porous Ln2NiO4+d electrodes, Abstract Electro-ceramics IX. Cherbourg May 31-Jun. 3, 2004.*

(Continued)

*Primary Examiner* — Alix Eggerding
(74) *Attorney, Agent, or Firm* — Hultquist, PLLC; Steven J. Hultquist (57) ABSTRACT

This invention relates to a method for preparing an air electrode based on $Pr_{2-x}NiO_4$ with $0 \leq x < 2$, comprising a step consisting in sintering a ceramic ink comprising $Pr_{2-x}NiO_4$ and a pore-forming agent at a temperature above 1000° C. and below or equal to 1150° C. This invention also relates to the air electrode thus obtained and its uses.

19 Claims, 2 Drawing Sheets

(56) References Cited

U.S. PATENT DOCUMENTS

| | | | |
|---|---|---|---|
| 2010/0239959 A1* | 9/2010 | Lust | H01M 4/8621 |
| | | | 429/535 |
| 2011/0229786 A1 | 9/2011 | Di Iorio et al. | |
| 2011/0253548 A1 | 10/2011 | Di Iorio et al. | |
| 2012/0186976 A1 | 7/2012 | Laucournet et al. | |
| 2013/0137014 A1* | 5/2013 | Lin | H01M 8/0282 |
| | | | 429/510 |
| 2013/0284591 A1 | 10/2013 | Delahaye et al. | |

OTHER PUBLICATIONS

Ferchaud, C., et al., "High performance praseodymium nickelate oxide cathode for low temperature solid oxide fuel cell", "Journal of Power Sources", Sep. 22, 2010, pp. 1872-1879, vol. 196.

Huang, X., et al., "Preparation and characteristics of Pr1.6Sr0.4NiO4+YSZ as composite chathode of solid oxide fuel cells", "Journal of Physics and Chemistry of Solids", 2009, pp. 665-668, vol. 70.

Kim, J., et al., "Characterization of LSM-YSZ composite electrode by ac impedance spectroscopy", "Solid State Ionics", 2001, pp. 379-389, vol. 143.

Mawdsley, J., et al., "Electrode Materials Development for High Temperature Steam Electrolysis", "211th Electrochemical Society (ECS) Meeting Abstract", May 6-10, 2007, p. 1, Published in: Chicago, IL.

Meng, X., et al., "Characterization of $Pr_{1-x}Sr_xCo_{0.8}Fe_{0.2}O_{3-\omega}$ (0.2 less than equal to x less than equal to 0.6) cathode materials for intermediate-temperature solid oxide fuel cells", "Journal of Power Sources", May 27, 2008, pp. 581-585, vol. 183.

Nishimoto, S., et al., "Properties of $La_{2-x}Pr_xNiO_4$ cathode for intermediate-temperature solid oxide fuel cells", "Journal of the Ceramic Society of Japan", Mar. 1, 2011, pp. 246-250, vol. 119, No. 3.

Skinner, S., et al., "Oxygen diffusion and surface exchange in $La_{2-x}Sr_xNiO_{4+\omega}$", "Solid State Ionics", 2000, pp. 709-712, vol. 135.

Taillades, G., et al., "Intermediate Temperature Anode-Supported Fuel Cell Based on $BaCe_{0.9}Y_{0.1}O_3$ Electrolyte with Novel $Pr_2NiO_4$ Cathode", "Fuel Cells", Oct. 1, 2009, pp. 166-173, vol. 10, No. 1.

Unpublished U.S. Appl. No. 14/112,341, filed Oct. 17, 2013.

* cited by examiner

METHOD FOR PRODUCING AN AIR ELECTRODE, THE ELECTRODE THUS OBTAINED AND ITS USES

CROSS-REFERENCE TO RELATED APPLICATIONS

This application is a U.S. national phase under the provisions of 35 U.S.C. §371 of International Patent Application No. PCT/EP12/53896 filed Mar. 7, 2012, which in turn claims priority of French Patent Application No. 11 51919 filed Mar. 9, 2011. The disclosures of such international patent application and French priority patent application are hereby incorporated herein by reference in their respective entireties, for all purposes.

TECHNICAL DOMAIN

The present invention relates to the domain of new energy technologies offering devices and methods for promoting renewable energies and limiting greenhouse gas emissions.

More particularly, the present invention relates to the domain of electrochemical cells and particularly solid oxide fuel cells (SOFC) and solid oxide electrolysis cells (SOEC).

The present invention discloses a method for producing an air electrode, also known under the expression "oxygen electrode", based on the $Pr_2NiO_4$ oxide compound or an associated compound with an optimised microstructure capable of giving good electrochemical performances. The present invention also relates to the air electrode thus obtained and its uses particularly in electrochemical cells.

STATE OF PRIOR ART

A great deal of work has been done to improve the performances of reversible solid oxide electrochemical cells (SOFC/SOEC) at operating temperatures and to reduce these operating temperatures. Research is currently being carried out to reduce traditional operating temperatures of 1000° C. to intermediate temperatures of the order of 700 to 800° C. A reduction of operating temperatures can reduce or even eliminate degradation of components of electrochemical cells and extend the range of materials that can be used to prepare such cells. This reduction can improve the durability of cells and reduce their cost.

However, reducing the operating temperature reduces speeds/kinetics of electrochemical reactions and in particular increases electrode polarisation resistances. Thus, a major obstacle to the development of electrochemical cells operating at high temperature and intermediate temperature lies in the total electrical resistance of the cathode//electrolyte//anode elementary cell and therefore of each of these elements taken separately.

These components include the air electrode also known as an <<oxygen electrode>>. A considerable amount of research is being done on such electrodes that correspond to the cathode for an SOFC and the anode for an SOEC. Two main methods can be used separately or together to reduce the total electrical resistance of this electrode:

- finding new materials that are better ionic and/or electronic conductors (low intrinsic resistance);
- optimising its microstructure/architecture to reduce its intrinsic resistance.

A great deal of research work for applications in electrochemical cells has been done on perovskite materials with structure $ABO_3$ where A is a rare earth and B is a transition metal. The rare earth advantageously used in these materials is lanthanum that may be partially substituted by strontium. These compounds include LSM (e.g. $La_{0.8}Sr_{0.2}MnO_3$), LSF (e.g. $La_{0.5}Sr_{0.5}FeO_3$) and LSCF (e.g. $La_{0.58}Sr_{0.4}Co_{0.2}Fe_{0.8}O_3$).

In addition to these materials, new oxide compounds with variable performance have been found such as BSCF (e.g. $Ba_{0.5}Sr_{0.5}Co_{0.8}Fe_{0.2}O_3$), PSCF (e.g. $Pr_{0.58}Sr_{0.4}Co_{0.2}Fe_{0.8}O_3$), $Nd_2NiO_4$, $Nd_{1.95}NiO_4$, $Nd_{1.97}NiO_4$ or $Pr_2NiO_4$.

Compounds with formula $Ln_2NiO_{4+y}$, where Ln represents a lanthanide, and especially, La, Nd and Pr, have high ionic conduction due to their chemical structure, making them attractive materials for air electrodes. Furthermore, the mobility of oxygen in these materials has been reported at a temperature as low as 450° C. [1]. Another advantage of these materials lies in the correlation between their coefficient of thermal expansion and the coefficient of thermal expansion of materials usually used as electrolytes such as an Yttrium Stabilised Zirconia (YSZ) electrolyte or a Gadolinia Doped Ceria (GDC) electrolyte.

Among these compounds, according to the literature, nickel and praseodymium oxide ($Pr_2NiO_4$) appears to be a very promising material, particularly with a polarisation resistance of 0.06 $\Omega \cdot cm^2$ at 800° C. in air [2]. This value should be compared with the value 0.27 $\Omega \cdot cm^2$ obtained with conventional LSM material under identical measurement conditions [3].

The article by Taillades et al., 2009 [4], discloses a ceramic ink comprising $Pr_2NiO_4$, ethylcellulose and terpineol deposited by screen printing on the electrolyte layer based on $BaCe_{0.9}Y_{0.1}O_{3-\delta}$ (BCY10) and then sintered at a temperature of 1200° C. for 1 h. This work reports that the polarisation resistance of $Pr_2NiO_4$ is of the order of 1 to 2 $\Omega \cdot cm^2$ at 600° C. and of the order of 0.1 to 0.2 $\Omega \cdot cm^2$ at 800° C. in air.

However, even if the $Pr_2NiO_4$ material has been studied in more or less detail by the various teams, their work did not achieve polarisation resistances of less than ~0.045 $\Omega \cdot cm^2$ at 800° C. in air, which is the value obtained for an electrode based on $Pr_{0.6}Sr_{0.4}CO_{0.8}Fe_{0.2}O_3$ [5]

The advantages of an air electrode based on $Pr_2NiO_4$ can be further increased by reducing its total electrical resistance and particularly its polarisation resistance. Therefore, there is a real need for a $Pr_2NiO_4$-based electrode with improved properties in terms of total electrical resistance. The inventors decided to develop a method for forming a $Pr_2NiO_4$-based air electrode to achieve an optimised microstructure in terms of reducing the polarisation resistance while maintaining mechanical cohesion of the electrode.

PRESENTATION OF THE INVENTION

This invention solves all technical problems like those defined above, so that the purpose fixed by the inventors can be achieved.

Work done by the inventors has resulted in the development of a method for preparing a $Pr_2NiO_4$-based air electrode or an compound associated with a polarisation resistance of less than 0.06 $\Omega \cdot cm^2$ and particularly less than 0.045 $\Omega \cdot cm^2$ at 800° C. in air.

Such an improvement was obtained by partial sintering of a ceramic ink containing not only $Pr_2NiO_4$ or an associated compound, but also a pore-forming agent. The sintering temperature was determined such that the material obtained maintains electrocatalytic properties and a sufficient porosity, particularly an open porosity, with good electrical conduction, and that when included in an electrochemical cell, bonds well to the adjacent layer such as the electrolyte layer or a barrier layer. The electrochemical cell must also be sufficiently strong mechanically. Finally, the sintering step must not affect the microstructural homogeneity of the material obtained in terms of porosity or particle size.

Thus, this invention relates to a method for preparing a $Pr_{2-x}NiO_4$-based air electrode with $0 \leq x < 2$, comprising a step consisting in sintering a ceramic ink comprising $Pr_{2-x}NiO_4$ and a pore-forming agent at a temperature above 1000° C. and below or equal to 1150° C.

As previously justified, the basic material of the air electrode prepared according to the invention corresponds to nickel and praseodymium oxide (case in which x=0) or an associated compound, i.e. with a similar formula but under-stoechiometric in praseodymium. These associated compounds satisfy the formula $Pr_{2-x}NiO_4$ where $0 < x < 2$, particularly $0 < x \leq 1$ and advantageously $0 < x \leq 0.5$.

The compound $Pr_{2-x}NiO_4$, where x is as defined above, may be a commercial compound or a compound prepared from commercial precursors such as $Pr_6O_{11}$ and nickel. Those skilled in the art know different protocols that can be used to prepare a $Pr_{2-x}NiO_4$ compound where x is as defined above, from such precursors. One particular example of such a protocol is wet chemical citrate-nitrate synthesis. Regardless of whether the $Pr_{2-x}NiO_4$ compound is a commercial compound or was prepared before the method according to the invention is used, a calcination step can be included to eliminate organic constituents that might have participated in the preparation of this compound. Advantageously, this prior calcination step is applied at a temperature of between 500 and 800° C., particularly between 600 and 700° C. and especially of the order of 650° C. (i.e. 650° C.±20° C.) for a duration between 15 min and 3 h, particularly between 30 min and 2 h and especially of the order of 1 h (i.e. 1 h±15 min).

$Pr_{2-x}NiO_4$, where x is as defined above, is in the form of a powder. The powder used may have a specific surface area determined by the BET (Brunauer, Emett and Teller) method using the Beckman's Coulter Surface Area Analyser, comprised between 1 and 15 m²/g and particularly between 2 and 10 m²/g. Specifically, the particles forming this powder have a median diameter (d50), determined using the Malvern particle size analyser, comprised between 0.1 and 1 μm and especially between 0.2 and 0.7 μm. For example and non-exhaustively, $Pr_2NiO_4$ used in the experimental part given below is in the form of particles for which the median diameter (d50), determined using the Malvern particle size analyser, is about 0.46 μm, which means that half of the $Pr_2NiO_4$ powder particles used have a diameter of less than 0.46 μm.

Furthermore, the particles forming the $Pr_{2-x}NiO_4$ powder have a diameter d90, determined using the Malvern particle size analyser, of between 0.5 and 2 μm and especially between 0.7 and 1.5 μm. For example and non-exhaustively, $Pr_2NiO_4$ used in the experimental part given below is in the form of particles for which the diameter d90, determined using the Malvern particle size analyser, is about 0.97 μm, which means that 90% of $Pr_2NiO_4$ powder particles used have a diameter of less than 0.97 μm.

The quantity of $Pr_{2-x}NiO_4$, where x is as defined above and particularly $Pr_{2-x}NiO_4$ powder, where x is as defined above, expressed by mass relative to the total mass of said ink is between 30 and 70%, particularly between 40 and 60% and advantageously of the order of 48% (i.e. 48%±5%).

The pore-forming agent also contained in the ceramic ink used in the method according to the invention contributes to the final porosity of the material forming the air electrode prepared using the method according to the invention. In particular, the pore-forming agent creates an open porosity. Open porosity means that the pores created in the material are communicating. This pore-forming agent is eliminated during the sintering step in the method according to the invention.

Advantageously, the pore-forming agent used in this invention is in the form of a powder. The particles forming this powder particularly have a median diameter (d50), determined using the Malvern particle size analyser, below 4 μm, advantageously below 2 μm, particularly between 20 and 400 nm, and especially between 30 and 200 nm. As a non-exhaustive example, acetylene black used in the experimental part described below is in the form of particles with a median diameter (d50) of about 40 nm, which means that half of the particles of acetylene black powder used have a diameter of less than 40 nm.

Furthermore, the pore-forming agent powder used has a specific surface area determined by the BET (Brunauer, Emett and Teller) method using Beckman's Coulter Surface Area Analyser, comprised between 30 and 150 m²/g and particularly between 40 and 100 m²/g.

The pore-forming agent may be any pore-forming agent known to those skilled in the art. Advantageously, this pore-forming agent is a natural or artificial compound in powder form, selected from among acetylene black, polystyrene, polymethyl methacrylate (PMMA), starch, polyethylene, cyclodextrine, a wax, a monosaccharide, an oligosaccharide such as saccharose and a polysaccharide. More particularly, the pore-forming agent used is acetylene black.

The Mp/(Mc+Mp) mass ratio, where Mp is the mass of pore-forming agent and Mc is the mass of $Pr_{2-x}NiO_4$ and where x is as defined above is between 1.5 and 10%, particularly between 2 and 7.5% and especially between 2.5 and 5%.

The ceramic ink is also referred to as a "slurry".

The ceramic ink comprising $Pr_{2-x}NiO_4$ where x is as defined above and a pore-forming agent as used in the method according to the invention, is a dispersion (or suspension) of $Pr_{2-x}NiO_4$ powder and pore-forming agent in an aqueous or organic solvent.

Any ceramic ink composition known to those skilled in the art can be used for preparation of the ceramic ink comprising $Pr_{2-x}NiO_4$ and a pore-forming agent used for this invention.

Thus, said ceramic ink comprises at least one element selected from among a solvent, a dispersant, a binder and a plasticizer.

For this invention, the solvent is the dispersion vehicle for $Pr_{2-x}NiO_4$ powder and the pore-forming agent powder. It may be an organic solvent, a mixture of organic solvents, water or a mixture of water and organic solvent(s). For the purposes of this invention, an organic solvent is a solvent that belongs to the family of ketones, ethers-oxides, esters, alcohols, hydrocarbons, particularly aromatic hydrocarbons or terpenes. Organic solvents that can be used for this invention include Methyl Ethyl Ketone (MEK), butyl acetate, ethylglycol, ethanol, toluene, cyclohexanone, butylcarbitol acetate, terpineol and mixture thereof, such as an azeotropic mixture of MEK and ethanol. The organic solvent used preferentially for this invention is terpineol.

A dispersant may be used in the composition of ceramic ink to improve the stability of the suspension, to prevent agglomeration of powders contained in this suspension, and consequently to obtain a homogeneous layer. Any dispersant known to those skilled in the art can be used in the ceramic ink composition used in this invention. Dispersants that can advantageously be used are selected from among oleic acid, ester phosphate, polyvinyl butyral and mixtures thereof.

In the ceramic ink composition, the binder improves coherence of the ink once it has been deposited and increases the density by creating organic bridges between the particles forming it ($Pr_{2-x}NiO_4$ powder and pore-forming agent powder). Any binder known to those skilled in the art can be used in the ceramic ink composition used in the present invention. Binders that can advantageously be used are selected from among polypropylene carbonate, polyvinyl butyral, poly isobutyl methacrylate, ethylcellulose and mixtures thereof. The binder most frequently used for the present invention is ethylcellulose.

Furthermore, the ceramic ink composition may comprise a plasticiser, the role of which is to improve the flexibility of the ink once it has been deposited, and therefore its spreading on the substrate. Any plasticiser known to those skilled in the art can be used in the composition of the ceramic ink used in the present invention. Plasticisers that can advantageously be used are selected from among glycols such as polyethylene glycol and phthalates such as butylbenzyl phthalate and dibutyl phthalate.

Advantageously, the ceramic ink used for this invention comprises at least one solvent and at least one binder. In particular, this ink includes terpineol and ethylcellulose. The Ml/(Ml+Ms) mass ratio, where Ms is the mass of the solvent and typically the mass of terpineol, and Ml is the mass of binder and typically the mass of ethylcellulose, is between 1 and 10%, particularly between 2 and 8% and especially between 4 and 6%.

The ceramic ink containing $Pr_{2-x}NiO_4$ where x is as defined above and a pore-forming agent is prepared by mixing the $Pr_{2-x}NiO_4$ powder where x is as defined above and the pore-forming agent, then by incorporating this first mixture (hereinafter referred to as mixture 1) with the solvent previously mixed with at least one element selected from among a solvent, a dispersant, a binder and a plasticiser (hereinafter referred to as mixture 2). The M1/(M1+M2) ratio where M1 is the mass of mixture 1 and M2 is the mass of mixture 2 is between 30 and 70%, particularly between 40 and 60% and especially of the order of 50% (i.e. 50%±5%).

Once the various constituents of the ceramic ink have been mixed and homogenised, this ink may be deaerated.

In the method according to the invention, the sintering step of the ceramic ink containing $Pr_{2-x}NiO_4$ powder where x is as defined above and the pore-forming agent powder, is performed at a temperature of more than 1000° C. and less than or equal to 1150° C. This temperature is advantageously between 1050 and 1150° C. More particularly, the sintering temperature used is 1100° C.

The ceramic ink containing $Pr_{2-x}NiO_4$ powder where x is as defined above and the pore-forming agent powder is subjected to the predefined sintering temperature for a duration of between 1 and 5 h and particularly between 2 and 4 h. Advantageously, this duration is of the order of 3 h (i.e. 3 h±15 min).

The ceramic ink deposited in the form of an electrode containing $Pr_{2-x}NiO_4$ and the pore-forming agent (may be dried before the sintering step. It is typically dried at a temperature of between 20° C. and 200° C., particularly between 80° C. and 120° C. and especially at a temperature of the order of 100° C. (100° C.±10° C.) for a duration of between 3 and 45 min, particularly between 5 and 30 min and especially for 15 min.

Before the sintering step, the possibly dried ceramic ink is at a temperature between 10 and 40° C., particularly between 18 and 30° C. and advantageously at ambient temperature. "Ambient temperature" for the purposes of the present invention means a temperature of 23 C±3° C. The ceramic ink is increased to the sintering temperature following a temperature rise gradient of between 50 and 400° C./h, particularly between 100 and 200° C./h and especially of the order of 150° C./h (i.e. 150° C./h±25° C./h).

Similarly, subsequent to the sintering step, the layer obtained from the ceramic ink is brought to a temperature of between 10 and 40° C., particularly between 18 and 30° C. and advantageously at ambient temperature. The layer is brought from the sintering temperature to the cooled temperature along a cooling gradient of between 50 and 400° C./h, particularly between 100 and 200° C./h and especially of the order of 150° C./h (i.e. 150° C./h±25° C./h).

The sintering step and the temperature increase and reduction steps may be done in a programmable furnace such as a continuous sliding slabs furnace, a roller furnace, a bogie-hearth furnace, a static furnace, a chamber furnace or a bell furnace. The furnace size will be chosen so that it can be adapted to the size of the air electrode to be prepared.

The sintering step and the temperature increase and reduction steps are advantageously done in air.

The present invention also relates to the air electrode that can be prepared using the method according to the invention as defined above. In other words, this invention relates to an air electrode based on $Pr_{2-x}NiO_4$ with $0 \leq x < 2$, obtained by sintering of a ceramic ink containing $Pr_{2-x}NiO_4$ and a pore-forming agent. This air electrode is different from air electrodes according to the state of the art based on $Pr_{2-x}NiO_4$ where x is as defined above, due to the fact that it has a polarisation resistance less than 0.06 $\Omega \cdot cm^2$ at 800° C. in air, particularly less than 0.045 $\Omega \cdot cm^2$ at 800° C. in air and especially, less than 0.02 $\Omega \cdot cm^2$ at 800° C. in air. The polarisation resistance is determined by complex impedance spectrometry at 800° C. in air.

This air electrode is also characterised by a remarkable microstructural homogeneity in terms of the porosity and also the component particle size, as given in the example below and in FIG. 2.

The air electrode based on $Pr_{2-x}NiO_4$ where x is as defined above and that can be prepared using the method according to the invention as defined above has a porous structure. The pores of this electrode may be connected or isolated. However, most pores are connected and in communication with each other, and are also in communication with the environment of the air electrode. We then talk about open porosity. The open porosity of the air electrode according to the invention is between 30 and 70%, particularly between 40 and 60% and especially of the order of 50% (i.e. 50%±5%), the percentage being expressed as a volume relative to the total volume of the air electrode.

This invention also relates to an electrochemical (half-)cell comprising an air electrode as defined above or that can be prepared using a preparation method such as defined above.

As a reminder, an electrochemical cell corresponds to the association of at least two electrodes and at least one electrolyte and particularly comprises two electrodes and one electrolyte. In fact, an electrochemical half-cell corresponds to the association of at least one electrode and at least one electrolyte and particularly comprises one electrode and one electrolyte. The different elements making up the electrochemical (half-)cell are in the form of approximately parallel layers applied one above the other.

In an electrochemical half-cell, the air electrode according to the invention corresponds not only to the functional layer in which the electrochemical reactions take place, but also to the current collecting layer. The thickness of said air electrode in the electrochemical half-cell according to the invention is between 4 and 16 µm, particularly between 6 and 12 µm and especially of the order of 8 µm (i.e. 8 µm±1 µm).

An electrochemical half-cell according to the invention comprises an air electrode according to the invention and an electrolyte that can possibly be separated from said air electrode by means of one (or several) barrier layer(s) preventing any reactivity between the material forming the electrolyte and the material forming the air electrode according to the invention i.e. $Pr_{2-x}NiO_4$ where x is as defined above. In one particular embodiment, the electrochemical half-cell according to the invention comprises an electrolyte, a barrier layer and an air electrode according to the invention.

Any material usually used such as an electrolyte can be used for the purposes of the invention.

Advantageously, considering the coefficient of thermal expansion of the material based on $Pr_{2-x}NiO_4$, where x is as defined above, the electrolyte used is chosen from among a stabilised zirconia-based electrolyte, and particularly yttrium-stabilised zirconia (YSZ) or an electrolyte based on substituted (or doped) ceria and particularly Gadolinia Doped Ceria (GDC). In particular, the electrolyte used is an Yttrium Stabilized Zirconia (YSZ) electrolyte.

Regardless of which electrolyte is used, it is typically in the form of a dense layer, i.e. a layer with a total porosity of less than 15% and particularly less than 10%, expressed as a volume relative to the total volume of the electrolyte layer.

The barrier layer as used in the electrochemical half-cell according to the invention is a porous layer for which the open porosity is between 10 and 60%, particularly between 20 and 50% and especially of the order of 30% (i.e. 30%±5%), the percentage being expressed as a volume relative to the total volume of the barrier layer.

Advantageously, the porous barrier layer may be a stabilised zirconia layer and/or a doped ceria layer. More particularly, this barrier layer is a GDC or YDC (Yttria Doped Ceria) layer.

Said barrier layer in the electrochemical half-cell according to the invention is between 1 and 8 µm thick, particularly between 2 and 6 µm thick and especially of the order of 3 µm (i.e. 3 µm±1 µm) thick.

A particular example of an electrochemical half-cell according to the invention comprises:

i) a dense electrolyte and particularly a dense Yttrium Stabilized Zirconia (YSZ) electrolyte;

ii) a barrier layer made from stabilised zirconia and/or from doped ceria, particularly based on GDC or YDC, and deposited on said electrolyte and iii) an air electrode as defined above and deposited on said barrier layer.

In this particular example, the barrier layer and the air electrode have thicknesses as defined above, particularly of the order of 3 µm and 8 µm respectively.

An electrochemical cell according to the present invention comprises an electrochemical half-cell as defined above and at least one hydrogen or water electrode and possibly one (or several) barrier layer(s) separating said hydrogen or water electrode from the electrolyte.

Any material usually used as the basic material for a hydrogen or water electrode can be used for the electrochemical cell according to the invention. Those skilled in the art will be able to determine if one (or several) barrier layer(s) should be used to separate the material used and the electrolyte material used depending thereon, and if so, the nature of the barrier compound(s) to be used.

The electrochemical cell according to the invention may be a solid oxide fuel cell (SOFC) or a solid oxide electrolysis cell (SOEC). Furthermore, the properties and characteristics of the air electrode present in this cell make it possible to use it at operating temperatures of less than 1000° C. and particularly at intermediate temperatures such as temperatures between 700 and 800° C.

Finally, the present invention relates to a method for preparing an electrochemical (half)-cell according to the invention. Such a method consists in depositing the different layers one above the other, the deposit possibly being made using any of the techniques normally used in preparation of the electrochemical cells. Particular examples of such techniques for forming layers making up these cells include screen printing, tape casting, spin coating or dip coating.

In one particular embodiment of the method according to the invention, the method according to the invention comprises steps consisting in:

a) depositing a precursor of the barrier layer on a dense electrolyte particularly as defined above;

b) depositing a ceramic ink containing $Pr_{2-x}NiO_4$ and a pore-forming agent as defined above, on said precursor; and then c) applying a sintering step as defined above to the assembly.

A "barrier layer precursor" means a composition that, once the sintering step (c) has been performed, can form a barrier layer as defined above, namely a porous barrier layer and particularly a stabilised zirconia-based layer and/or a doped ceria layer, and particularly a GDC— or YDC-based layer.

The precursor of the barrier layer is advantageously a ceramic ink comprising stabilised zirconia and/or doped ceria in powder form, and particularly powder GDC or powder YDC.

The powder used in the ceramic ink used to prepare the barrier layer has a specific surface area determined by the BET (Brunauer, Emett and Teller) method using Beckman's Coulter Surface Area Analyser comprised between 5 and 20 $m^2/g$ and particularly between 7 and 15 $m^2/g$. In particular, the particles making up this powder have a median diameter (d50) determined using the Malvern particle size analyser of between 0.1 and 1 µm and particularly between 0.2 and 0.7 µm. As a non-exhaustive example, the GDC powder used in the experimental part described below is in the form of particles of which the median diameter (d50) determined using the Malvern particle size analyser is 0.5 µm, which means that half of the particles of GDC powder used have a diameter of less than 0.5 µm.

Furthermore, the particles making up the powder used in the ceramic ink used to prepare the barrier layer have a diameter d90 determined using the Malvern particle size analyser comprised between 0.5 and 3 µm, and particularly between 1 and 2 µm. As a non-exhaustive example, the GDC powder used in the experimental part described below is in the form of particles for which the diameter d90 determined using the Malvern particle size analyser is about 1.30 µm, which means that 90% of the particles of GDC powder used have a diameter of less than 1.30 µm.

All the above mentioned for ceramic ink containing $Pr_{2-x}NiO_4$ and the pore-forming agent is applicable mutatis mutandis to the ceramic ink used to prepare the barrier layer (particularly in terms of constituents (solvent, binder, dispersant, plasticiser) and optional deaeration step.

The ceramic ink used to prepare the barrier layer may have a basic composition (solvent, binder, dispersant and/or plasticiser) identical to or different from the ceramic ink containing $Pr_{2-x}NiO_4$ and the pore-forming agent. Advantageously, the two ceramic inks have an identical basic composition. Thus, the ceramic ink used to prepare the barrier layer comprises at least one solvent and at least one binder. In particular, this ink comprises terpineol and ethylcellulose. The Ml/(Ml+Ms) mass ratio where Ms is the mass of solvent and typically the mass of terpineol, and Ml is the mass of binder and typically the mass of ethylcellulose is between 1 and 10%, particularly between 2 and 8% and especially between 4 and 6%.

The ceramic ink used to prepare the barrier layer is prepared by mixing stabilised zirconia and/or doped ceria in powder form and particularly GDC powder or YDC powder with the solvent previously mixed with at least one element selected from among a solvent, a dispersant, a binder and a plasticiser (hereinafter referred to as mixture 4). The M3/(M3+M4) ratio, where M3 is the mass of stabilised zirconia powder and/or doped ceria powder and particularly the mass of GDC powder or the mass of YDC powder and M4 is the mass of mixture 4, is between 30 and 70%, particularly between 40 and 60% and especially of the order of 50% (i.e. 50%±5%).

The deposition methods used in steps (a) and (b) may be identical or different and be chosen from among screen printing, tape casting, spin coating and dip coating. Advantageously, these two methods are identical. In particular, these two deposits are made by screen printing. In fact, the ceramic ink used in step (a) and the ceramic ink used in step (b) may be designated under the term <<screen printing ink>>.

The ceramic ink may be dried after it has been used to prepare the barrier layer deposited on the surface of the electrolyte and before step (b) in the method according to the invention. The deposited layer is dried typically at a temperature of between 30 and 180° C., particularly between 70 and 160° C. and especially at a temperature of the order of 140° C. (i.e. 140° C.±10° C.) for a duration between 3 and 45 min, particularly between 5 and 30 min and especially for 15 min.

Similarly, once the ceramic ink containing $Pr_{2-x}NiO_4$ and the pore-forming agent has been deposited on the surface of the ceramic ink used to prepare the possibly dried barrier layer and prior to step (c) in the method according to the invention, the ceramic ink containing $Pr_{2-x}NiO_4$ and the pore-forming agent may be dried as defined for the air electrode preparation method.

Step (c) in the method according to the invention has all the characteristics of the sintering step as defined for the air electrode preparation method.

The duration, temperature, temperature rise and cooling during step (c) are as previously defined for the air electrode preparation method.

Other characteristics and advantages of this invention will become clear after reading the examples given below for illustrative and non-limitative purposes, with reference to the appended figures.

BRIEF DESCRIPTION OF THE DRAWINGS

FIG. 1 shows micrographs in Scanning Electron Microscopy (SEM) in secondary electrons mode of the fracture surface of an electrochemical half-cell with an optimised air electrode based on $Pr_2NiO_4$.

DETAILED PRESENTATION OF PARTICULAR EMBODIMENTS

I. Preparation Method According to the Invention.
I.1. Initial Compounds.
This method is based on:
an initial $Pr_2NiO_4$ powder with a specific surface area of ~4.4 $m^2/g$ and a particle size distribution with the following characteristics: $d_{50}$ ~0.46 µm and $d_{90}$ ~0.97 µm. This oxide is used to make the functional layer of the electrode that also acts as a collecting layer;
a so-called <<barrier>> compound based on Gadolinia Doped Ceria (GDC) used as a barrier layer, in the form of a deposit, to limit the chemical reactivity between the compound in the functional layer and the material forming the electrolyte. This powder has a particle size distribution such that $d_{50}$ is ~0.5 µm and $d_{90}$ is ~1.30 µm. Its specific surface area is equal to 12.2 $m^2/g$.
acetylene black or acetylene carbon that is used as a pore-forming agent and has a centred particle size distribution such that $d_{50}$ is ~40 nm for a specific surface area of 62 $m^2/g$.

I.2. Preparation of Silk-Screen Printing Inks.
The electrode is formed from these compounds, using the screen printing deposition technique. Therefore, the following step is to produce two screen printing inks.

A first ink is made using the GDC powder compound that is added at 50% by mass to a solvent/binder mixture itself composed of 95% by mass of terpineol and 5% by mass of ethylcellulose.

A second ink is made from a mix composed of 97.5% by mass of $Pr_2NiO_4$ and 2.5% by mass of acetylene carbon for the solid part that is added at 50% by mass to a solvent/binder mixture itself composed of 95% by mass of terpineol and 5% by mass of ethylcellulose.

Once these mixtures have been prepared, they are homogenised and deaerated if necessary.

I.3. Making Screen Printing Deposits.
The electrode is then made on the surface of the electrolyte by deposition using a screen printing machine.

A first deposit about ~5 µm thick is made on the surface of the electrolyte (8YSZ) using GDC ink. This deposit is then dried in a drying oven with temperature increased to 140° C. for 15 min.

A second deposit is made using ink containing $Pr_2NiO_4$ and the pore-forming agent, about ~15 µm thick on the previous deposit once the previous deposit is dry.

When this final deposit has been made, a new drying step at 140° C. for 15 min is necessary in a drying oven before the partial sintering treatment.

I.4. Sintering the Electrode.
A final heat treatment is necessary to eliminate the pore-forming agent and to partially sinter the electrode. The purpose of partial sintering is to create sintering bridges or necks between $Pr_2NiO_4$ particles while maintaining sufficient porosity to allow free gas circulation.

The optimum treatment that consists of a 3 h plateau at 1100° C. is as follows:

25° C.-150° C./h→1100° C./3 h-150° C./h→25° C.

The electrode based on $Pr_2NiO_4$ is ready for use at the end of this heat treatment.

II. Microstructural Characterisations of the Electrode.

Figure 1A:
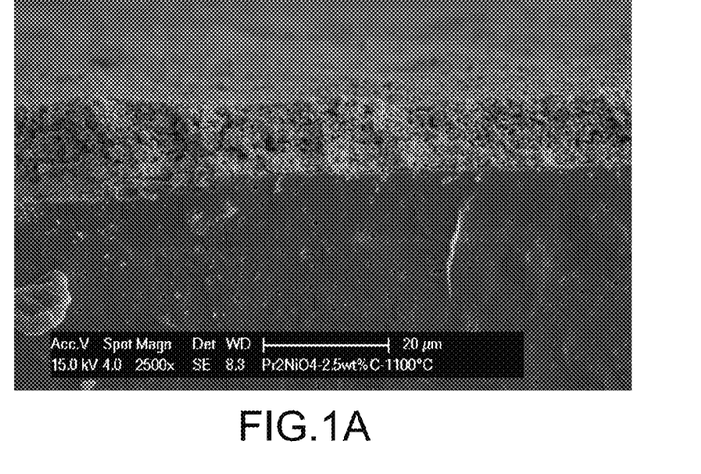
FIG. 1A is a general view of the half-cell, showing from bottom to top the electrolyte, the barrier layer and the air electrode according to the invention.

The heat treated electrode has a homogenous microstructure as shown on the SEM micrographs in FIG. 1.

Figure 1B:
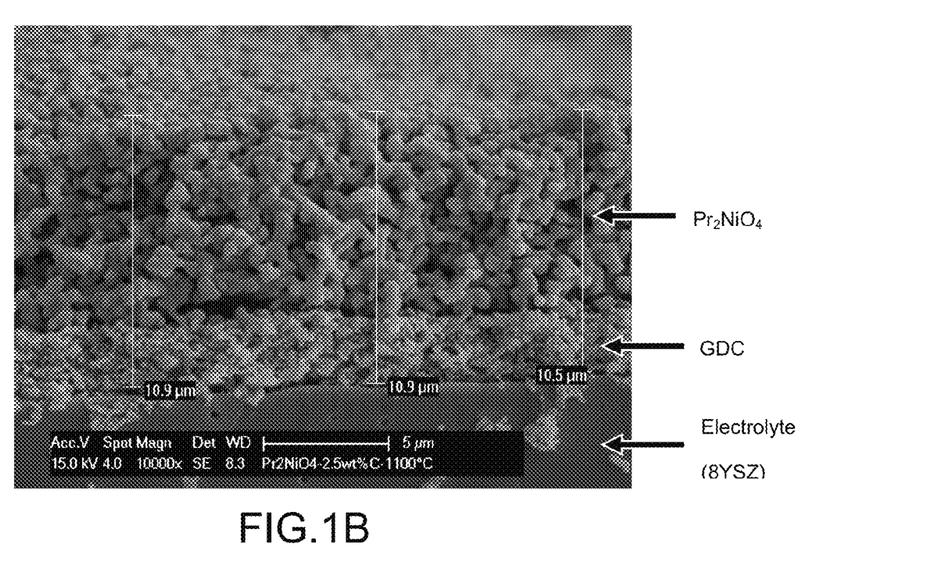
FIG. 1B is a more precise view, centred on the upper part of the electrolyte (8YSZ), the barrier layer (GDC) and the air electrode according to the invention ($Pr_2NiO_4$).

On these micrographs, a distinction can be made between the GDC layer at the interface with the electrolyte and the $Pr_2NiO_4$ layer above it (FIG. 1B).

The thickness of the GDC layer is about 3 μm while the thickness of the $Pr_2NiO_4$ layer is about 8 μm. These two layers are porous and due to partial sintering, the particles forming them have approximately maintained their initial size.

The open porosity of the $Pr_2NiO_4$ layer represents ~50% of its volume.

Figure 2:
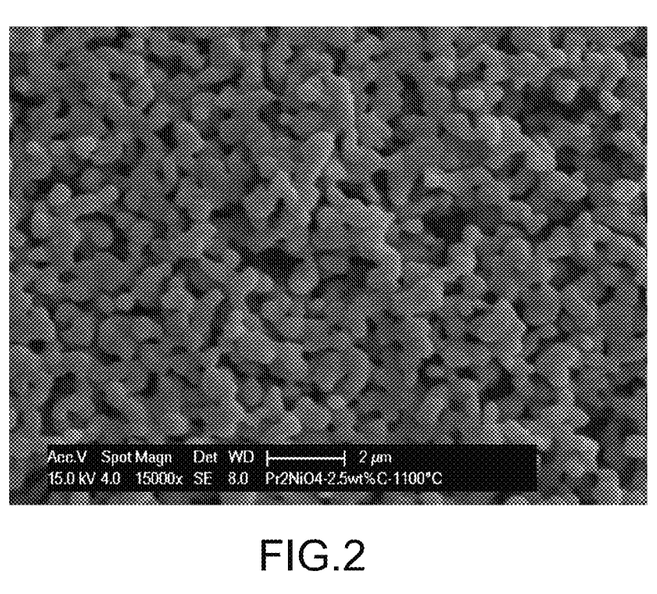
FIG. 2 shows an SEM micrograph in secondary electrons mode of the surface of an optimised air electrode based on $Pr_2NiO_4$.

This microstructural homogeneity of the porosity and particle size can also be seen by observation of the electrode surface by SEM (FIG. 2).

III. Electrochemical Characterisations of the Electrode.

Symmetric electrode//electrolyte//electrode cells have been prepared based on these optimisations, and tested by complex impedance spectroscopy in air at 800° C.

Figure 3:
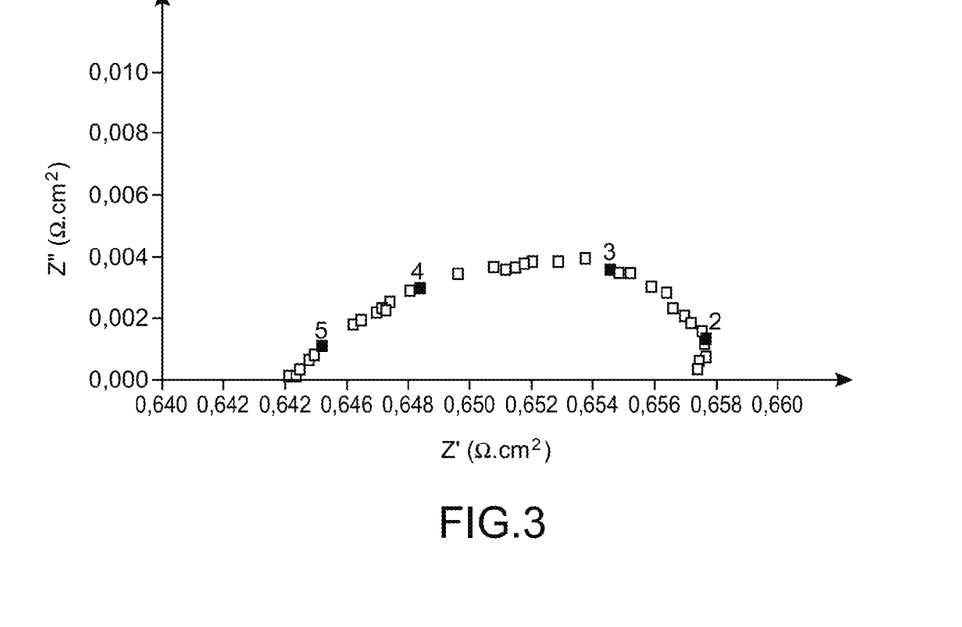
FIG. 3 is a Nyquist representation of the complex impedance spectrum obtained at 800° C. in air from the optimised symmetric cell based on $Pr_2NiO_4$.

The results obtained are shown in the spectrum in FIG. 3. Using this spectrum, a polarisation resistance of ~0.013 $\Omega \cdot cm^2$ at 800° C. in air can be determined, which is a value ~4.6 times below the value given in the literature [2]. This result demonstrates the importance of the microstructural optimisation defined herein. Values of polarisation resistance in air were measured at different temperatures and are summarised in Table 1.

TABLE 1

Values of polarisation resistance (Rp) for an optimised electrode based on $Pr_2NiO_4$ at different temperatures.

| T (° C.) | Rp ($\Omega \cdot cm^2$) | 1000/T (K) |
| --- | --- | --- |
| 700 | 0.037 | 1.02775 |
| 750 | 0.022 | 0.97752 |
| 800 | 0.013 | 0.93197 |

REFERENCES

[1] Skinner and Kilner, 2000. <<Oxygen diffusion and surface exchange in $La_{2-x}Sr_xNiO_{4+d}$>>, Solid State Ionics, vol. 135, pages 709-712.

[2] Mawdsley and al., 2007, Electrode Materials Development for High Temperature Steam Electrolysis, Abstract n° 334, 211$^{th}$ ECS Meeting transaction.

[3] Kim and al., 2001. <<Characterization of LSM-YSZ composite electrode by ac impedance spectroscopy>>, Solid State Ionics, vol. 143, pages 379-389.

[4] Taillades and al., 2010. <<Intermediate temperature anode-supported fuel cell based on $BaCe_{0.9}Y_{0.1}O_3$ electrolyte with novel $Pr_2NiO_4$ cathode>>, Fuel Cells, vol. 1, pages 166-173.

[5] Meng et al., 2008, <<Characterization of $Pr_{1-x}Sr_xCo_{0.8}Fe_{0.2}O_{3-\delta}$ (0.2≤x≤0.6) cathode materials for intermediate temperature solid oxide fuel cells>>, Journal of Power Sources, vol. 183, pages 581-585.

The invention claimed is:

1. Method for preparing an air electrode based on $Pr_{2-x}NiO_4$ with 0≤x<2, comprising sintering a ceramic ink comprising $Pr_{2-x}NiO_4$ and a pore-forming agent at a temperature above 1000° C. and below or equal to 1150° C., wherein, before the sintering step, said ceramic ink is brought to the sintering temperature following a temperature rise gradient of between 50 and 400° C./h.

2. Method according to claim 1, wherein the quantity of $Pr_{2-x}NiO_4$ powder with 0≤x<2, expressed by mass relative to the total mass of said ink is comprised between 30 and 70%.

3. Method according to claim 1, wherein said pore-forming agent is in the form of a powder the particles of which have a median diameter (d50), determined using the Malvern particle size analyser, below 4 μm.

4. Method according to claim 1, wherein said pore-forming agent is selected from the group consisting of acetylene black, polystyrene, polymethyl methacrylate (PMMA), starch, polyethylene, cyclodextrine, a wax, monosaccharide, oligosaccharide and polysaccharide.

5. Method according to claim 1, wherein the mass ratio Mp/(Mc+Mp) where Mp is the mass of pore-forming agent and Mc is the mass of $Pr_{2-x}NiO_4$ with 0≤x<2 is between 1.5 and 10%.

6. Method according to claim 1, wherein said ceramic ink comprises at least one solvent and at least one binder and wherein the mass ratio Ml/(Ml+Ms) where Ms is the mass of solvent and Ml is the mass of binder, is between 1 and 10%.

7. Method according to claim 1, wherein said ceramic ink is subjected to the sintering temperature for a duration of between 1 and 5 h.

8. Method for preparing an air electrode based on $Pr_{2-x}NiO_4$ with 0≤x<2, comprising sintering a ceramic ink comprising $Pr_{2-x}NiO_4$ and a pore-forming agent at a temperature above 1000° C. and below or equal to 1150° C., wherein, subsequent to the sintering step, said ceramic ink is brought to a temperature of between 10 and 40° C., the layer being brought from the sintering temperature to the cooled temperature along a cooling gradient of between 50 and 400° C./h.

9. Air electrode based on $Pr_{2-x}NiO_4$ with 0≤x<2, obtained by sintering a ceramic ink containing $Pr_{2-x}NiO_4$ and a pore-forming agent at a temperature above 1000° C. and below or equal to 1150° C., wherein, before the sintering step, said ceramic ink is brought to the sintering temperature following a temperature rise gradient of between 50 and 400° C./h, and wherein the air electrode has a polarisation resistance below 0.06 $\Omega \cdot cm^2$ at 800° C. in air.

10. Air electrode according to claim 9, wherein the air electrode has an open porosity between 30 and 70%, the percentage being expressed as a volume relative to the total volume of the air electrode.

11. Electrochemical half-cell comprising an air electrode based on $Pr_{2-x}NiO_4$ with 0≤x<2, obtained by sintering a ceramic ink containing $Pr_{2-x}NiO_4$ and a pore-forming agent at a temperature above 1000° C. and below or equal to 1150° C., wherein, before the sintering step, said ceramic ink is brought to the sintering temperature following a temperature rise gradient of between 50 and 400° C./h, and wherein the air electrode has a polarisation resistance below 0.06 $\Omega \cdot cm^2$ at 800° C. in air.

12. The electrochemical half-cell according to claim 11, wherein the air electrode has an open porosity between 30 and 70%, the percentage being expressed as a volume relative to the total volume of the air electrode.

13. The electrochemical half-cell according to claim 11, comprising:

i) a dense electrolyte;

ii) a barrier layer made from stabilised zirconia and/or from doped ceria, and deposited on said electrolyte; and iii) the air electrode deposited on said barrier layer.

14. The electrochemical half-cell according to claim 13, wherein the air electrode has an open porosity between 30 and 70%, the percentage being expressed as a volume relative to the total volume of the air electrode.

15. Electrochemical cell comprising an electrochemical half-cell as defined in claim 14 and at least one hydrogen or water electrode and optionally one or more barrier layer(s) separating said hydrogen or water electrode from the electrolyte.

16. The electrochemical half-cell according to claim 13, wherein the dense electrolyte is a dense Yttrium Stabilized Zirconia (YSZ) and the barrier layer is based on Gadolinia Doped Ceria (GDC) or Yttria Doped Ceria (YDC).

17. Electrochemical cell comprising an electrochemical half-cell as defined in claim 13 and at least one hydrogen or water electrode and optionally one or more barrier layer(s) separating said hydrogen or water electrode from the electrolyte.

18. Method for preparing an electrochemical half-cell comprising an air electrode based on $Pr_{2-x}NiO_4$ with $0 \leq x < 2$, wherein the air electrode has a polarisation resistance below $0.06 \; \Omega \cdot cm^2$ at 800° C. in air, comprising:

a) depositing a precursor of a barrier layer on a dense electrolyte;

b) depositing a ceramic ink comprising $Pr_{2-x}NiO_4$ with $0 \leq x < 2$ and a pore-forming agent, on said precursor; and then c) applying to the assembly a sintering step at a temperature above 1000° C. and below or equal to 1150° C., wherein, before the sintering step, said ceramic ink is brought to the sintering temperature following a temperature rise gradient of between 50 and 400° C./h.

19. Method according to claim 18, wherein the air electrode has an open porosity between 30 and 70%, the percentage being expressed as a volume relative to the total volume of the air electrode.

* * * * *